United States Patent

Scholtysik et al.

[11] Patent Number: 5,198,959
[45] Date of Patent: Mar. 30, 1993

[54] DEMAGNETIZING DEVICE FOR MAGNETIC RECORDING MEDIA

[75] Inventors: Bernd Scholtysik; José Toral; Hermann Brandstetter; Manfred Baumann, all of Munich, Fed. Rep. of Germany

[73] Assignee: BASF Aktiengesellschaft, Ludwigshafen

[21] Appl. No.: 672,282

[22] Filed: Mar. 20, 1991

[30] Foreign Application Priority Data

Mar. 21, 1990 [DE] Fed. Rep. of Germany ... 9003286[U]

[51] Int. Cl.$^5$ .............................................. H01F 13/00
[52] U.S. Cl. ....................................... 361/149; 307/101
[58] Field of Search ............... 361/151, 267, 149, 143; 307/101; 335/284; 198/346.2

[56] References Cited

U.S. PATENT DOCUMENTS

| | | | |
|---|---|---|---|
| 3,143,689 | 8/1964 | Hall | 361/151 |
| 3,938,011 | 2/1976 | Littwin | 361/151 |
| 4,346,425 | 8/1982 | Gray | 361/151 |
| 4,423,460 | 12/1983 | Jackson et al. | 361/151 |
| 4,551,782 | 11/1985 | Seely et al. | 361/151 |
| 4,621,299 | 11/1986 | Hill | 361/151 |

FOREIGN PATENT DOCUMENTS

| | | |
|---|---|---|
| 0142238 | 5/1985 | European Pat. Off. . |
| 0265095 | 4/1988 | European Pat. Off. . |
| 3736024 | 3/1989 | Fed. Rep. of Germany . |
| 1441742 | 5/1966 | France . |
| 2130001 | 5/1984 | United Kingdom . |

*Primary Examiner*—A. D. Pellinen
*Assistant Examiner*—Fritz M. Fleming
*Attorney, Agent, or Firm*—Herbert B. Keil

[57] ABSTRACT

The invention relates to a demagnetizing device for magnetic recording media, so-called pancakes, wound up in the form of a tape, which device consists of a cylindrical coil (1), the field distribution (3) of which extends essentially parallel to the winding plane (2) of the recording medium (4), while the pancakes (4) can be inserted into the coil (1) in the axial direction by a lifting device (5). The compact form enables an entire pancake stack to be demagnetized at the same time (FIGURE).

2 Claims, 1 Drawing Sheet

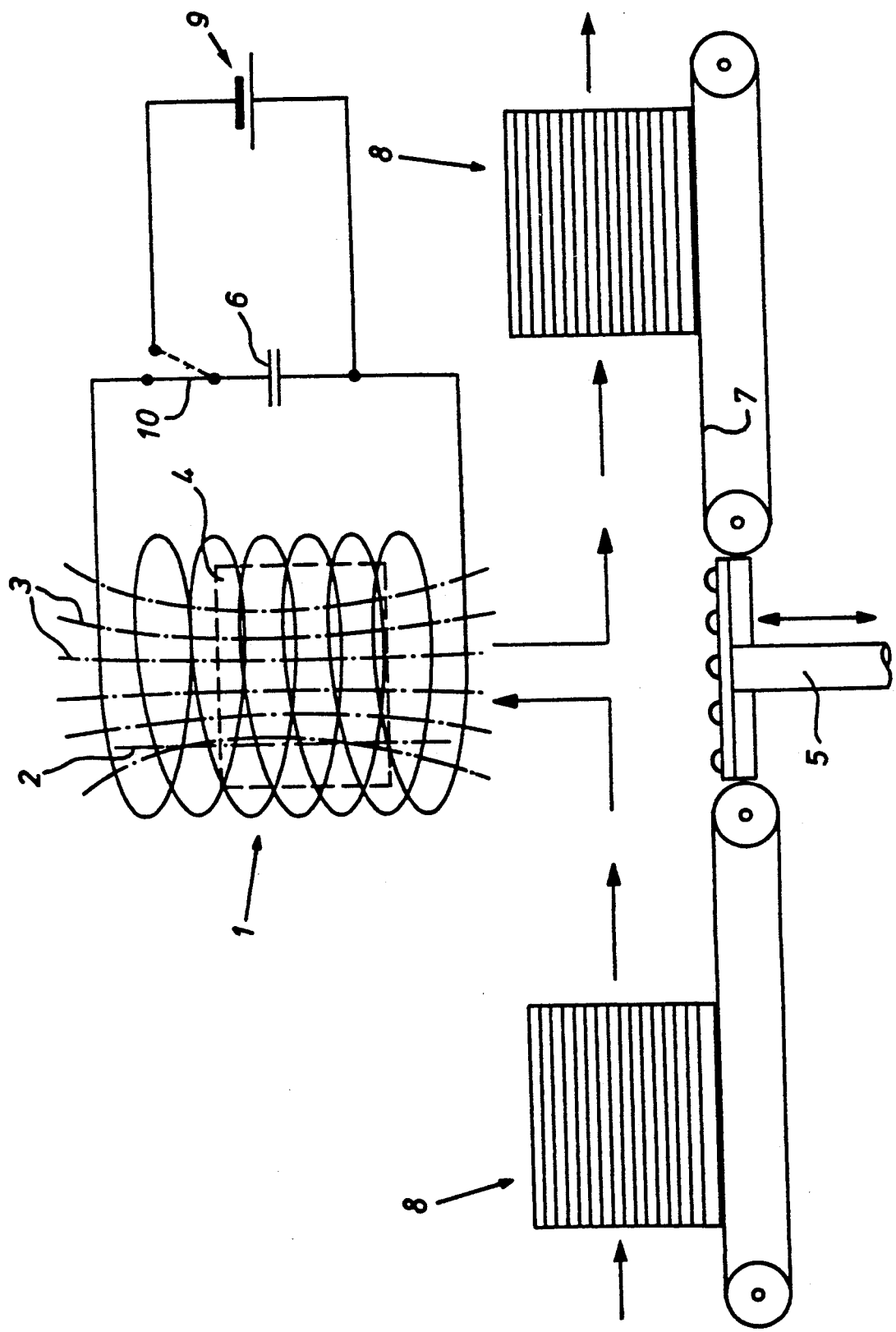

DEMAGNETIZING DEVICE FOR MAGNETIC RECORDING MEDIA

BACKGROUND OF THE INVENTION

The invention relates to a device for demagnetizing one or more magnetic recording media, preferably in the form of a tape and wound up, which device consists of an alternating current-operated coil which is provided with exciting windings and into the interior of which the recording media can be inserted.

A device of this kind is known from GB 2 130 001. According to the teachings of this document a spool around which magnetic tape is wound is inserted in the radial direction into the interior of an electromagnet, the field distribution of which extends essentially perpendicular to the winding plane and parallel to the direction in which the spool is inserted. A resonant circuit is formed by a charged capacitor and the windings of the electromagnet, the alternating field of which circuit erases the recording on the magnetic tape spool, which rotates about the winding axis in this drawer-type tape eraser. This device necessitates complicated operating procedures and is unsuitable, for example, for demagnetization several wound-up recording media stacked on top of one another.

Further demagnetizing devices known from the prior art are described in the DE-C 37 36 024 of the applicants, for example. This specification comprises a description of a demagnetizing device which consists of an alternating current-operated electromagnet which is provided with exciting windings and between the yokes of which, arranged on either side of the recording medium to be demagnetize, the latter is moved by means of a conveying device, an essentially perpendicular alternating field distribution existing between the opposite yokes and the magnetic recording media initially passing through an area of constant flux density in the free space between the yokes, in which area there is a constant perpendicular spacing between the two yokes with respect to the direction of a movement and at a right angle thereto, and then through a further area in which the perpendicular spacing between the yokes increases monotonically and the flux density decreases. Although a device of this kind can in fact simultaneously erase up to 15 wound-up recording media stacked on top of one another—so-called pancakes—in one pass, it is extremely large and very heavy and therefore exceedingly expensive to acquire and operate.

SUMMARY OF THE INVENTION

The object of the invention was therefore to find a device of the category in question which:
  is of a simple design
  can be operated at low energy costs
  can erase pancakes coming from a production line, possibly completely packaged, with a fast cycle time or pass time.

The object was solved according to the invention by a device for demagnetizing one or more magnetic recording media, preferably wound up in the form of a tape, comprising essentially an alternating current-operated cylindrical coil which is provided with exciting windings the field distribution of which extends essentially parallel to the winding plane of the recording medium and wherein the recording medium is inserted into the coil in the axial direction by a lifting device. Further details of the invention will emerge from, the description and the FIGURE.

DETAILED DESCRIPTION OF THE PREFERRED EMBODIMENTS

The invention will now be described in detail on the basis of the FIGURE, which shows a diagrammatic cross section through the demagnetizing device according to the invention.

The magnetic recording media (8) are conveyed on a conveyor belt (7) in the direction of the arrow to the erasing device (1). This consists of a solenoid with cylindrical coil windings which an be operated by a charged capacitor (6). The alternating current in coil 1 originates from the power source 9. This power source 9 is any source for direct current (d.c.). Such sources are well known in the art. The direct current from the power source 9 charges a capacitor 6 when switch 10 is in the position shown in the Drawing. Following charging of the capacitor, the switch 10 may be placed in a position to connect the capacitor 6 with the winding coils 1, so as to discharge the capacitor 6. Once the recording medium or stack reaches the device (1), the conveyor belt stops and the stack (8) is lifted into the interior of the device (1) by a lifting device (5), which is not shown in detail, so that the recording media are disposed coaxially in the coil. The capacitor (6) is then discharged through the windings of the coil, and the magnetic tape spools or the stack are completely erased by the alternating field resulting in the form of a damped oscillation. The device according to the invention operates very efficiently in this respect, as the field distribution (3) of the alternating field extends essentially parallel to the winding plane (2) of the recording media (4), quite unlike the closest prior art, the above-mentioned document GB 2 130 001. It has become apparent that due to the relatively homogeneous magnetic field resulting in the interior of the coil, recording media of a fairly and an extremely high coercive force can be quickly and completely erased.

The stack is then deposited on the conveyor belt by the lifting device, whereupon—after the capacitor has been charged—the device is ready to erase the next stack, and so forth.

EXAMPLE 1

A bank of capacitors with a capacitance of 3 mF was charged with a charging voltage of 3 kV in one example of use. The cylindrical shape eraser had an outside diameter of 950 mm, an inside diameter of 600 mm and a height of 500 mm, while the copper windings weighed 700 kg. A stack of 8 pancakes, each having a width of $\frac{1}{2}$ inch and disposed on top of one another, with a stack diameter of 16 inches was placed in the interior of the solenoid, whereupon the energy stored in the capacitor was discharged through the formed resonant circuit with a natural frequency of 50 Hz. The decay time was several seconds and the pancake stack was lifted out of the device again after 5 seconds. A check carried out on all the pancakes, which comprised a video tape with a coercive force of 48 kA/m, revealed that the tape was completely and uniformly erased.

EXAMPLE 2

The arrangement of Example 1 was also used in this case, but a stack of 25 pancakes, each 3.81 mm wide, in a complete packaging, consisting of foamed polystyrene as described in U.S. patent application Ser. No. 596,475, filed on Mar. 21, 1990, figure 5 was demagnetized in a packaged state.

EXAMPLE 3

The procedure was as in Example 2, although a pancake stack in a packaging as described in U.S. patent application Ser. No. 596,475, filed on Mar. 21, 1990, figure 1 was erased in the demagnetizing device according to the invention.

What is claimed is:

1. A device for demagnetizing a plurality of magnetic recording tapes in the form of a stack of tapes wound on cores with a common vertical axis consisting essentially of: (1) a lifting means for raising and lowering the magnetic tapes, (2) a conveying means for transporting the magnetic tape to and away from the lifting means, and (3) an alternating current-operated cylindrical coil degaussing means which contains windings exciting a magnetic field, the field distribution of which extends parallel to the axis of the stack of the magnetic recording tapes when the magnetic recording tapes are within the cylindrical coil degaussing means, said cylindrical coil being in the vertical position and directly above the lifting means so that when the magnetic recording tapes are lifted into the cylindrical coil degaussing means the axis of the tapes is lifted in the axial direction of the cylindrical coil degaussing means.

2. A device according to claim 1, wherein the cylindrical coil degaussing means is connected to a chargeable capacitor so that when in operation, a resonant circuit is formed by the coil and the capacitor, which circuit exhibits a decaying oscillation, which decaying oscillation demagnetizes the recording tapes.

* * * * *